US011013186B2

(12) United States Patent
Lang et al.

(10) Patent No.: US 11,013,186 B2
(45) Date of Patent: May 25, 2021

(54) BALER WITH ADJUSTABLE PRE-COMPRESSION CHAMBER

(71) Applicant: Deere & Company, Moline, IL (US)

(72) Inventors: Eric R. Lang, Newhall, IA (US); Kevin M. Tacke, Oskaloosa, IA (US)

(73) Assignee: DEERE & COMPANY, Moline, IL (US)

( * ) Notice: Subject to any disclaimer, the term of this patent is extended or adjusted under 35 U.S.C. 154(b) by 183 days.

(21) Appl. No.: 16/128,262

(22) Filed: Sep. 11, 2018

(65) Prior Publication Data
US 2020/0077595 A1    Mar. 12, 2020

(51) Int. Cl.
*A01F 15/04* (2006.01)
*A01F 15/10* (2006.01)
*A01F 15/08* (2006.01)

(52) U.S. Cl.
CPC .......... *A01F 15/101* (2013.01); *A01F 15/042* (2013.01); *A01F 15/0825* (2013.01); *A01F 2015/102* (2013.01)

(58) Field of Classification Search
CPC ........ A01F 15/04; A01F 15/046; A01F 15/10; A01F 15/145; A01F 15/0825; B30B 9/3032; B30B 9/3003
See application file for complete search history.

(56) References Cited

U.S. PATENT DOCUMENTS

| | | | | |
|---|---|---|---|---|
| 6,474,228 B1* | 11/2002 | Leupe | .................... | A01F 15/04 100/100 |
| 7,938,728 B2* | 5/2011 | Vetter | ................. | G07F 17/3216 273/143 R |
| 9,010,240 B2* | 4/2015 | Missotten | .......... | A01F 15/0825 100/35 |
| 9,386,750 B2 | 7/2016 | Verhaeghe et al. | | |
| 9,756,790 B2* | 9/2017 | Rosseel | ................. | A01D 89/00 |
| 9,823,147 B2* | 11/2017 | Verhaeghe | ............... | B62D 5/04 |
| 2017/0105353 A1 | 4/2017 | Rosseel et al. | | |

FOREIGN PATENT DOCUMENTS

| | | |
|---|---|---|
| EP | 0276496 A1 | 8/1988 |
| EP | 3219196 A1 | 9/2017 |
| WO | 2018109544 A1 | 6/2018 |

* cited by examiner

*Primary Examiner* — Matthew Katcoff
(74) *Attorney, Agent, or Firm* — Michael Best & Friedrich LLP

(57) ABSTRACT

A baler for use with a forming bale having a first bale attribute. The baler including a frame, and a compression system coupled to the frame where the compression system at least partially defines a compression chamber sized to receive at least a portion of the forming bale therein. The baler also includes a feed pan at least partially defining a pre-compression chamber, and where the shape of the pre-compression is adjustable, and where the pre-compression chamber is open to the compression chamber. The baler also includes a sensor configured to output signals representative of the first bale attribute, and a controller in operable communication with the feed pan and the sensor, and where the controller is configured to actively adjust the shape of the pre-compression chamber based at least in part upon the first bale attribute of the forming bale.

6 Claims, 11 Drawing Sheets

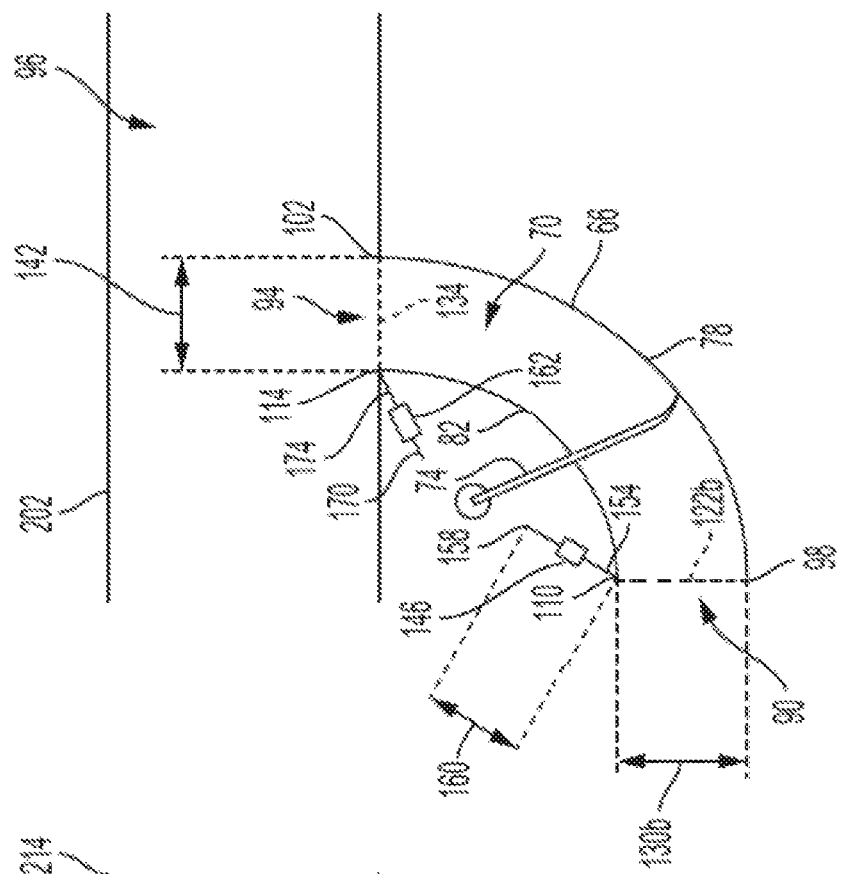
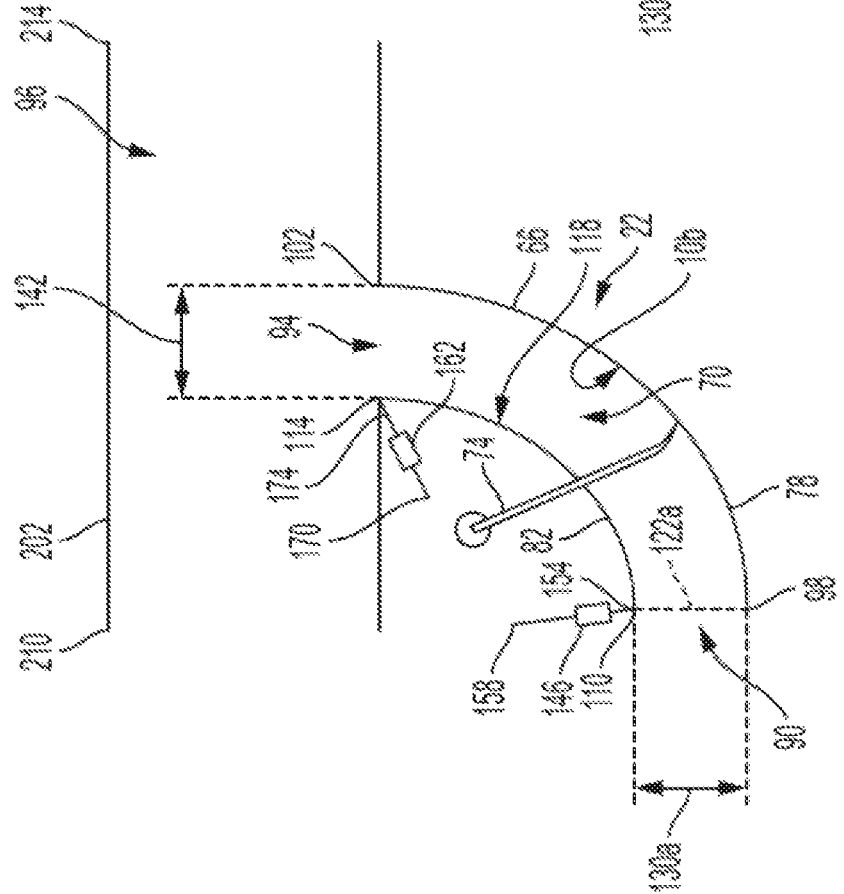

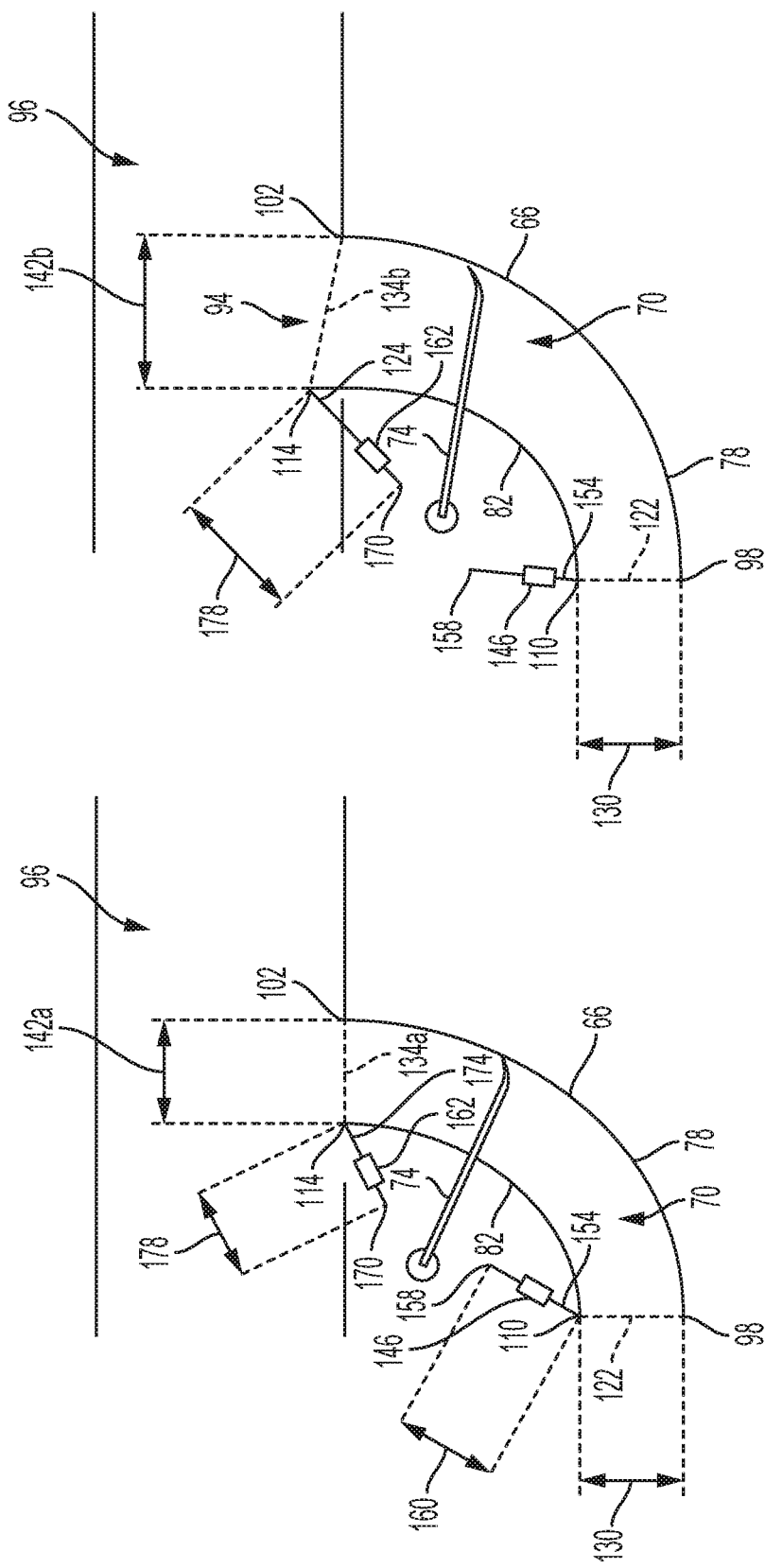

BALER WITH ADJUSTABLE PRE-COMPRESSION CHAMBER

FIELD OF THE INVENTION

The present invention relates to a baler and more specifically to a baler with an adjustable pre-compression chamber.

BACKGROUND

During operation of a square baler, crop material collects within the pre-compression chamber before being injected into the compression chamber for subsequent application to a forming bale.

SUMMARY

In one aspect, a baler for use with a forming bale having a first bale attribute, a frame, a compression system coupled to the frame where the compression system at least partially defines a compression chamber sized to receive at least a portion of the forming bale therein, a feed pan at least partially defining a pre-compression chamber, and where the shape of the pre-compression is adjustable, and where the pre-compression chamber is open to the compression chamber, a sensor configured to output signals representative of the first bale attribute, and a controller in operable communication with the feed pan and the sensor, and where the controller is configured to actively adjust the shape of the pre-compression chamber based at least in part upon the first bale attribute of the forming bale.

In another aspect, a baler for use with a forming bale having a first bale attribute, the baler including a frame, a compression system coupled to the frame, the compression system at least partially defining a compression chamber sized to receive at least a portion of the forming bale therein, a plunger positioned within and movable with respect to the compression chamber, a feed pan at least partially defining a pre-compression chamber, where the shape of the pre-compression is adjustable, and where the pre-compression chamber is open to the compression chamber, a first sensor in operable communication with the plunger and configured to output signals representing an orientation of the plunger with respect to the compression chamber, a second sensor in operable communication with the plunger and configured to output signals representing a compressive force applied by the plunger, and a controller in operable communication with the feed pan, the first sensor, and the second sensor, and where the controller is configured to actively adjust the shape of the pre-compression chamber based at least in part upon signals received from the first sensor and the second sensor.

In another aspect, a baler for use with a forming bale having a first bale attribute, the baler including a frame, a compression system coupled to the frame, the compression system at least partially defining a compression chamber sized to receive at least a portion of the forming bale therein, a feed pan at least partially defining a pre-compression chamber, where the pre-compression chamber is open to the compression chamber, a lifting fork in operable communication with the pre-compression chamber, and where the lifting fork is configured to direct crop material positioned within the pre-compression chamber into the compression chamber to be deposited onto the forming bale producing a deposit distribution, a sensor configured to output signals representative of the first bale attribute, and a controller in operable communication with the feed pan and the sensor, and where the controller is configured to adjust the deposit distribution based at least in part on the first bale attribute.

In another aspect, a baler for use with a forming bale having a first bale attribute, the baler including a frame, a compression system coupled to the frame, the compression system at least partially defining a compression chamber sized to receive at least a portion of the forming bale therein, a feed pan at least partially defining a pre-compression chamber, where the shape of the pre-compression is adjustable, and where the pre-compression chamber is open to the compression chamber, a sensor configured to output signals representative of the first bale attribute, and a controller in operable communication with the feed pan and the sensor, and where the controller is configured to output signals to the user based at least in part upon the first bale attribute of the forming bale.

Other aspects of the disclosure will become apparent by consideration of the detailed description and accompanying drawings.

BRIEF DESCRIPTION OF THE DRAWINGS

FIGS. 2A and 2B are schematic views of the baler of FIG. 1 showing the inlet of the pre-compression chamber in a constricted and enlarged configuration, respectively.

FIGS. 3A and 3B are schematic view of the baler of FIG. 1 showing the outlet of the pre-compression chamber in a constricted and enlarged configuration, respectively.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways. Directions such as clockwise and counterclockwise used herein are for illustrative purposes only.

Figure 1:
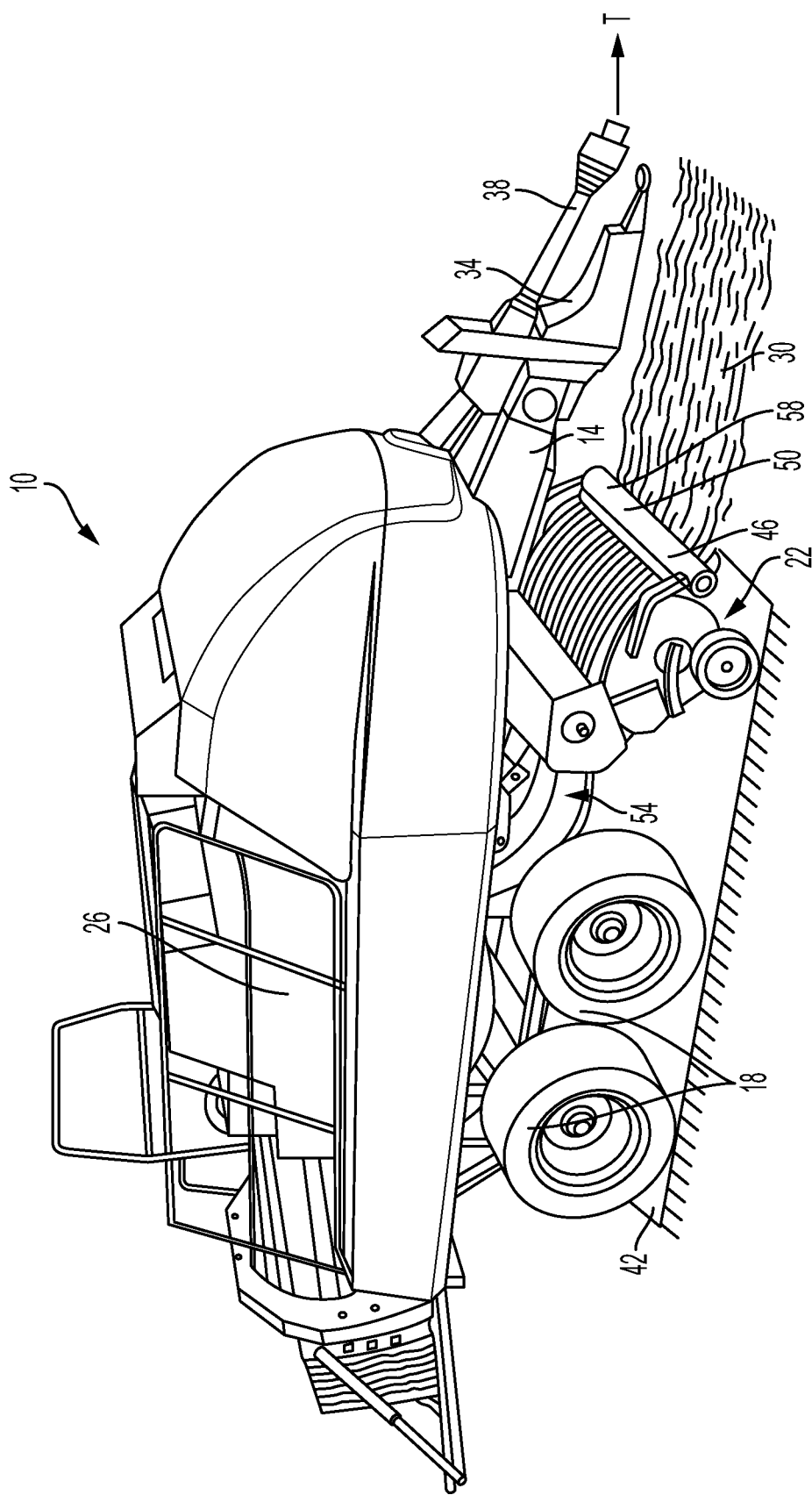
FIG. 1 is a perspective side view of a baler with an adjustable pre-compression chamber installed thereon.

Referring to FIG. 1, a baler 10 includes a frame 14, a set of wheels 18 mounted on the frame 14, a feed system 22 coupled to the frame 14, and a compression system 26 to receive and compress crop material 30 provided by the feed system 22.

In the illustrated embodiment, the frame 14 of the baler 10 includes a tow bar 34 extending from the frame 14 and connectable to a towing vehicle (not shown), such as an agricultural tractor or other vehicle. The baler 10 also includes a power takeoff shaft 38 connectable to the towing vehicle to transmit a rotating drive force from the towing vehicle to the various components of the baler 10. In other implementations, the baler 10 may have a dedicated power supply and/or prime mover (not shown), such as an engine, motor, battery, fuel cell, etc., for driving the wheels 18 and for driving and/or powering the various components of the baler 10 (described below).

As shown in FIG. 1, the feed system 22 of the baler 10 is configured to pick up crop material 30 from a support surface 42 and convey the crop material 30 to the compression system 26 for final densification and bale forming. The feed system 22 includes a pickup assembly 46 defining an inlet 50 for receiving the crop material 30 from the support surface 42 (i.e., a farm field), and a lifter assembly 54 to convey a metered amount of the crop material 30 into the compression system 26.

The pickup assembly 46 of the feed system 22 includes a roller baffle 58 oriented generally perpendicular to the direction of travel T (e.g., across the width) of the baler 10, and a pickup plate (not shown) disposed adjacent the roller baffle 58 for conveying the crop material 30 towards the lifter assembly 54.

Illustrated in FIGS. 1-3B and 5A-5F, the lifter assembly 54 of the feed system 22 includes a feed pan 66 at least partially defining an adjustable pre-compression chamber 70 therein, and a lifting fork 74 to selectively engage and maneuver the crop material 30 positioned within the pre-compression chamber 70.

Illustrated in FIGS. 2A-5F, the feed pan 66 of the lifter assembly 54 is substantially arcuate in shape having a first or fixed wall 78, a second or adjustable wall 82 spaced a distance from and movable relative to the first wall 78, and a pair of side walls (not shown) extending between the first wall 78 and the second wall 82 to at least partially enclose the pre-compression chamber 70 therebetween. The walls 78, 82 of the feed pan 66 also form an inlet 90 proximate the pickup assembly 46, and an outlet 94 opposite the inlet 90 and proximate the compression chamber 96 of the compression system 26. As shown in FIG. 2A, the pre-compression chamber 70 extends between the inlet 90 and outlet 94 of the feed pan 66 forming an elongated channel that is open on both ends.

Illustrated in FIGS. 2A-3B, the first wall 78 of the feed pan 66 is fixed relative to the frame 14 of the baler 10 and includes an elongated body having a first edge 98 positioned proximate to and at least partially defining the inlet 90 of the feed pan 66, a second edge 102 positioned proximate to and at least partially defining the outlet 94 of the feed pan 66, and an interior surface 106 extending between the first edge 98 and the second edge 102 to at least partially define the pre-compression chamber 70. In the illustrated implementation, the interior surface 106 of the first wall 78 is substantially arcuate in shape producing a substantially concave surface. However, in alternative implementations, the size and shape of the interior surface 106 of the first wall 78 may be any shape or contour necessary to help direct the crop material 30 discharged from the pickup assembly 46 into the compression chamber 96 of the compression system 26.

The second wall 82 of the feed pan 66 is movable relative to the first wall 78 and includes a body having a first edge 110 positioned proximate to and at least partially defining the inlet 90 of the feed pan 66, a second edge 114 positioned proximate to and at least partially defining the outlet 94 of the feed pan 66, and an interior surface 118 extending between the first edge 110 and the second edge 114 to at least partially define the pre-compression chamber 70. In the illustrated implementation, the interior surface 118 of the second wall 82 is substantially arcuate in shape producing a substantially convex surface that is similar in curvature to the interior surface 106 of the first wall 78.

In the illustrated implementation, the second wall 82 of the feed pan 66 is substantially rigid in shape, generally maintaining the convex contour of the interior surface 118 as the second wall 82 moves relative to the first wall 78. However, in alternative implementations, the second wall 82 may be flexible allowing the contour of the interior surface 118 to be actively altered during use to better direct the flow of crop material 30 through the pre-compression chamber 70. In such implementations, additional actuators (not shown) may be present to allow more thorough manipulation of the contour of the interior surface 118.

Illustrated in FIGS. 2A-3B, the inlet 90 of the feed pan 66 is at least partially defined by the first edge 98 of the first wall 78, the two side walls, and the first edge 110 of the second wall 82. The inlet 90, in turn, defines an inlet area 122 (e.g., the cross-sectional area of the inlet 90) having at least one adjustable inlet dimension. In the illustrated implementation, the inlet 90 is substantially rectangular in cross-sectional shape having a fixed inlet width (not shown), generally corresponding to the distance between the two side walls, and an adjustable inlet height 130, generally corresponding to the distance between the first edge 98 of the first wall 78 and the first edge 110 of the second wall 82. However, in alternative implementations, the inlet width and/or the inlet height 130 may be independently adjustable. In still other implementations, the inlet 90 may have different cross-sectional shapes.

During use, the inlet 90 is continuously adjustable between first constricted configuration (see FIG. 2A), in which the inlet 90 has a first inlet area 122*a* and a first inlet height 130*a*, and a second enlarged configuration (see FIG. 2B), in which the inlet 90 has a second inlet area 122*b* larger than the first inlet area 122*a* and a second inlet height 130*b* greater than the first inlet height 130*a*. More specifically, the inlet 90 is adjustable between the constricted configuration and the enlarged configuration by moving the first edge 110 of the second wall 82 relative to the first edge 98 of the first wall 78. For example, moving the first edge 110 of the second wall 82 away from the first edge 98 of the first wall 78 causes the inlet area 122 to increase and the inlet 90 to move toward the enlarged configuration. In contrast, moving the first edge 110 of the second wall 82 toward the first edge 98 of the first wall 78 causes the inlet area 122 to decrease and the inlet 90 to move toward the constricted configuration.

The outlet 94 of the feed pan 66 is at least partially defined by the second edge 102 of the first wall 78, the two sidewalls, and the second edge 114 of the second wall 82. The outlet 94, in turn, defines an outlet area 134 (e.g., the cross-sectional area of the outlet 94) having at least one adjustable outlet dimension. In the illustrated implementation, the outlet 94 is substantially rectangular in cross-sectional shape having a fixed outlet width (not shown), generally corresponding to the distance between the two side walls, and an adjustable outlet height 142, generally corresponding to the distance between the second edge 102 of the first wall 78 and the second edge 114 of the second wall 82. However, in alternative implementations, the outlet width and/or the outlet height 142 may be independently adjustable. Still further, the outlet 94 may have different cross-sectional shapes.

During use, the outlet 94 is continuously adjustable between a first constricted configuration (see FIG. 3A), in which the outlet 94 has a first outlet area 134*a* and a first outlet height 142*a*, and a second enlarged configuration (see FIG. 3B), in which the outlet 94 has a second outlet area 134*b* larger than the first outlet area 134*a* and a second inlet height 142*b* greater than the first outlet height 142*a*. More specifically, the outlet 94 is adjustable between the constricted configuration and the enlarged configuration by moving the second edge 114 of the second wall 82 relative to the second edge 102 of the first wall 78. For example, moving the second edge 114 of the second wall 82 away from the second edge 102 of the first wall 78 causes the outlet area 134 to increase and the outlet 94 to move toward the enlarged configuration. In contrast, moving the second edge 114 of the second wall 82 toward the second edge 102 of the first wall 78 causes the outlet area 134 to decrease and the outlet 94 to move toward the constricted configuration.

Figure 7A:
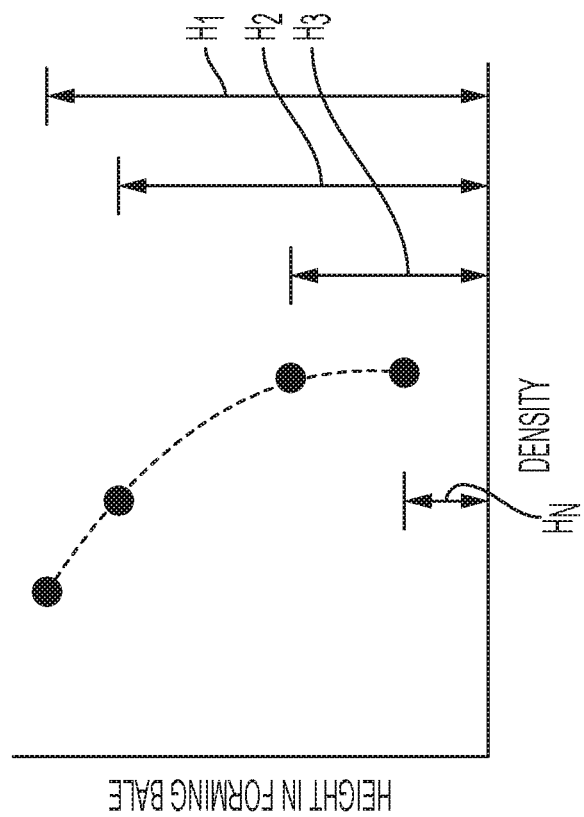
FIGS. 7A-7B illustrate a first and second vertical profile.
Figure 7B:
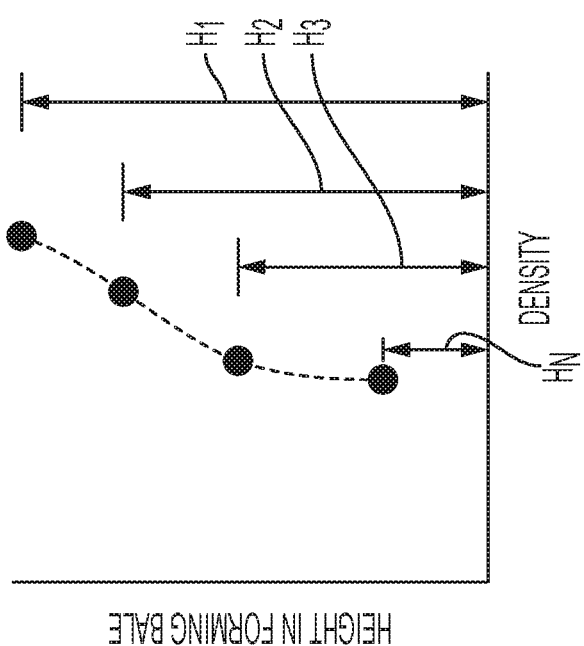

While the illustrated implementation includes a second wall 82 that is free to move relative first wall 78 at both ends thereof. In alternative implementations, the second wall 82 of the feed pan 66 may be pivotably mounted to the frame 14 for rotational movement relative to the first wall 78 (see FIG. 7). More specifically, the second wall 82 may be pivotably mounted proximate one of the first edge 110 and the second edge 114. In such implementations, the area of the end where the pivot point is located (e.g., the inlet 90) would be relatively fixed compared to the end opposite the pivot point (e.g., the outlet 94), where maximum adjustment would occur.

Illustrated in FIGS. 2A-3B, the feed pan 66 also includes a first set of one or more actuators 146, each in operable communication with the second wall 82 and configured to move the first edge 110 thereof relative to the first edge 98 of the first wall 78 independent the operation and motion of the compression system 26. More specifically, each actuator of the first set of actuators 146 includes a first end 154, and a second end 158 actively movable relative to the first end 154 to define an actuator length 160 therebetween. When assembled, the second end 158 of each actuator is fixed relative to the frame 14 of the baler 10 while the first end 154 of the actuator is fixedly coupled proximate the first edge 110 of the second wall 82. As such, changing the actuator length 160 causes the first edge 110 of the second wall 82 to move relative to the first edge 98 of the first wall 78 (compare FIG. 2A and FIG. 2B).

In the illustrated implementation, each actuator of the first set of actuators 146 lengthen and shorten together as a unit (e.g., each actuator has generally the same actuator length 160) so that the first edge 110 of the second wall 82 remains substantially parallel to the first edge 98 of the first wall 78 as it moves with respect thereto. By doing so, the inlet 90 allows a substantially even volume of crop material 30 to enter the pre-compression chamber 70 across the entire inlet width thereof. However in alternative implementations, each actuator of the first set of actuators 146 may be adjusted independently allowing the first edge 110 of the second wall 82 to be angled relative to the first edge 98 of the first wall 78. In such implementations, the angle between the first wall 78 and the second wall 82 can be used to adjust the relative volume of crop material 30 entering the pre-compression chamber 70 across the inlet width. In still other implementations, the actuators may be positioned and controlled independently such that the contour of the first edge 110 itself may be changed across the inlet width. In such implementations, the first edge 110 may be altered to form a curvilinear contour. While not shown, an additional subset of actuators may be present to adjust the contour of the first edge 98 of the first wall 78 as well.

Illustrated in FIG. 2A-3B, the feed pan 66 also includes a second set of one or more actuators 162, each in operable communication with the second wall 82 and configured to move the second edge 114 of the second wall 82 relative to the second edge 102 of the first wall 78 independent the operation and motion of the compression system 26. More specifically, each actuator of the second set of actuators 162 includes a first end 170, and a second end 174 actively movable relative to the first end 170 to define an actuator length 178 therebetween. When assembled, the first end 170 of each actuator is fixed relative to the frame 14 of the baler 10 while the second end 174 of the actuator is fixedly coupled proximate the second edge 114 of the second wall 82. As such, changing the actuator length 178 causes the second edge 114 of the second wall 82 to move relative to the second edge 102 of the first wall 78.

In the illustrated implementation, each actuator of the second set of actuators 162 lengthen and shorten together as a unit (e.g., each actuator has generally the same actuator length 178) so that the second edge 114 of the second wall 82 remains substantially parallel to the second edge 102 of the first wall 78 as it moves with respect thereto. By doing so, the outlet 94 allows a substantially even volume of crop material 30 to exit the pre-compression chamber 70 across the entire outlet width. However, in alternative implementations, each actuator of the second set of actuators 162 may be adjusted independently allowing the second edge 114 of the second wall 82 to be angled relative to the second edge 102 of the first wall 78. In such implementations, the angle between the first wall 78 and the second wall 82 can be used to adjust the relative volume of crop material 30 exiting the pre-compression chamber 70 across the outlet width. In still other implementations, the actuators may be positioned and controlled independently such that the contour of the second edge 114 itself may be changed and altered across the outlet width. In such implementations, the second edge 114 may be altered to form a curvilinear contour. While not shown, an additional subset of actuators may be present to adjust the contour of the second edge 102 of the first wall 78 as well.

In the illustrated implementation, each actuator of the first and second sets of actuators 146, 162 includes hydraulic actuators configured to selectively receive hydraulic fluid during use. However, in alternative implementations, the actuators may include, but are not limited to, electronic linear actuators, pneumatic actuators, gear drives, mechanical linkages, and the like. Still further, the actuators of each set of actuators 146, 162 are operable independently of one another.

During use, adjusting the size and shape of the pre-compression chamber 70 (e.g., the inlet 90 and the outlet 94) influences the manner in which the crop material 30 travels through the pre-compression chamber 70, is directed into the compression chamber 96, and ultimately establishes the pattern in which the crop material 30 is deposited onto the deposit surface 182 of the forming bale 186, herein referred to as the deposit distribution 190. More specifically, the controller 322 (described below) is able to modify the size and shape of the pre-compression chamber 70, including the inlet area 122, outlet area 134, and the like, by sending signals to at least one of the first set of actuators 146 and the second set of actuators 162. For the purposes of this application the deposit distribution 190 is generally defined as the relative volume of crop material 30 deposited at each location of the deposit surface 182 of the forming bale 186.

Figure 4A:
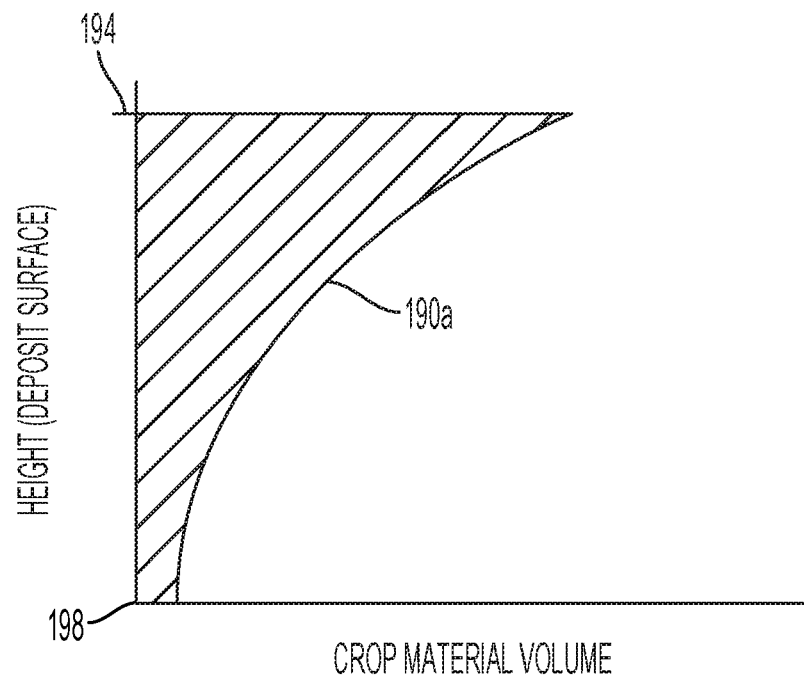
FIGS. 4A and 4B illustrate a first and second distribution pattern.
Figure 4B:
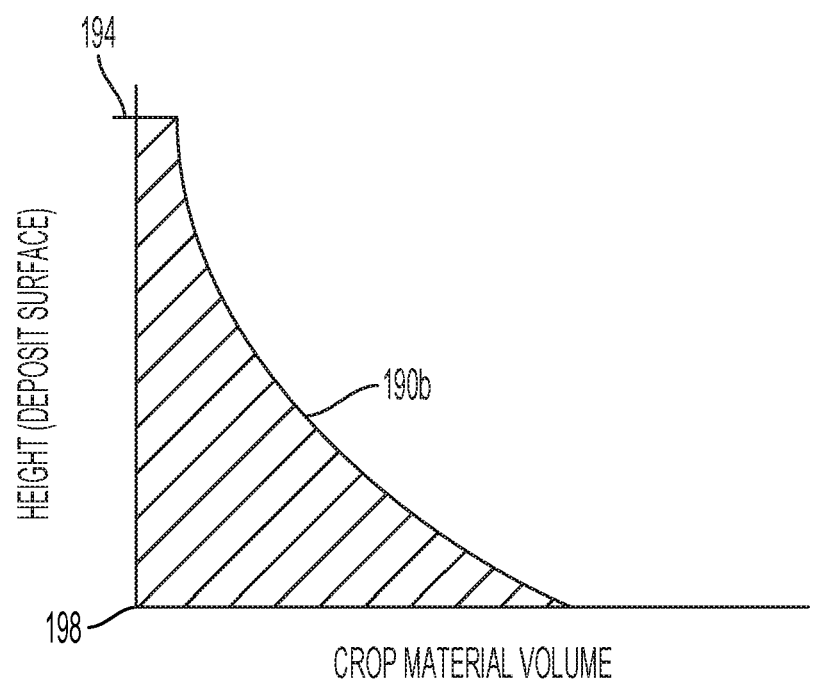

For example, placing the outlet 94 in the expanded configuration (e.g., increasing the outlet area 134) produces a first deposit distribution 190*a* in which a relatively larger volume of crop material 30 is deposited on the deposit surface 182 proximate the top edge 194 thereof (e.g., opposite the outlet 94) than is deposited proximate the bottom edge 198 (e.g., proximate the outlet 94; see FIG. 4A). In contrast, placing the outlet 94 in the constricted configuration (e.g., decreasing the outlet area 134) produces a second deposit distribution 190b in which a relatively larger volume of crop material 30 is deposited on the deposit surface 182 proximate the bottom edge 198 thereof than is deposited proximate the top edge 194 (see FIG. 4B). As discussed above, the second edge 114 of the second wall 82 remains substantially parallel to the second edge 102 of the first wall 78 causing the resulting deposit distributions 190a, 190b to be substantially equal along the width of the deposit surface. However, in alternative implementations, the relative orientation between the second edge 114 of the second wall 82 and the second edge 102 of the first wall 78 may be adjusted to vary the deposit distribution along the width of the deposit surface 182 (not shown).

Illustrated in FIGS. 5A-5F, the compression system 26 of the baler 10 includes the compression chamber 96 in communication with the feed system 22, a bale case 202 at least partially defining the compression chamber 96, and the plunger assembly 206 positioned at least partially within the compression chamber 96.

The bale case 202 is substantially rectangular in shape at least partially defining the compression chamber 96 therein. The bale case 202 includes a first open end 210 open to the compression chamber 96, and a second open end 214 open to the compression chamber 96 and opposite the first open end 210 being positioned proximate the rear of the baler 10. The bale case 202 also defines an axis 218 extending along the length of the bale case 202 proximate the cross-sectional center of the compression chamber 96. During use, the compression chamber 96 of the bale case 202 acts as a container, holding the forming bale 186 and one or more completed bales (not shown) against which the plunger assembly 206 compresses the newly introduced crop material 30 from the feed system 22. While doing so, the bale case 202 applies a compressive or otherwise resistive force against the forming bale 186 and any completed bales to resist motion within the bale case 202 toward the second open end 214. In particular, it is this resistive force that permits the compressive force of the plunger assembly 206 to compact the crop material 30 against the deposit surface 182 and into the forming bale 186.

In the illustrated implementation, the bale case 202 includes a top wall 222, a bottom wall 226 opposite the top wall 222, and a pair of side walls (not shown) extending between the top wall 222 and the bottom wall 226. Together, the walls 222, 226 of the bale case 202 produce a substantially square interior cross-section when taken perpendicular to the axis 218. Furthermore, the bottom wall 226 of the bale case 202 is open to and in communication with the outlet 94 of the pre-compression chamber 70 (see FIG. 5A).

For the purposes of this application, the "height" or vertical position of an object positioned within the compression chamber 96 of the bale case 202 is generally defined as the distance between the item and the bottom wall 226. Furthermore, the "width" of an item is generally measured perpendicular to the axis 218 between the side walls (not shown).

Referring now to FIGS. 5A-5F, the plunger assembly 206 of the compression system 26 includes a gearbox 230 having an output shaft 234, a pair of crank arms 238 each coupled to and rotatable together with the output shaft 234, the plunger 242 movable with respect to the compression chamber 96, and a connecting frame 246 extending between and coupled to both the plunger 242 and the crank arm 238.

During use, the gearbox 230 of the plunger assembly 206 receives input from a power takeoff shaft 250 which, in turn, is driven by an exterior source such as a tractor and the like (described above). In alternative implementations, the gearbox 230 may be driven by a stand-alone power system, such as an internal combustion engine. The gearbox 230 typically includes a number of gear sets (not shown) to transmit the torque provided by the power takeoff shaft 250 to the output shaft 234 at a given gear ratio. In some implementations, the gearbox 230 may have multiple, interchangeable gear sets to permit the gear ratio provided by the gearbox 230 to be changed according to current operating conditions.

The plunger 242 of the plunger assembly 206 includes a compression surface 254 configured to engage the crop material 30 positioned within the compression chamber 96. The compression surface 254 of the plunger 242 includes an upper edge 258 positioned proximate the top wall 222 of the compression chamber 96, a lower edge 262 opposite the upper edge 258 and positioned proximate the bottom wall 226 of the compression chamber 96, and a pair of side edges (not shown) extending between the upper edge 258 and the lower edge 262. In the illustrated implementation, the compression surface 254 of the plunger 242 is substantially planar (see FIGS. 5A-5F). However, in alternative implementations, the compression surface 254 may be arcuate or convex in contour having a substantially similar cross-sectional shape along its entire width (i.e., semi-cylindrical). In still other implementations, the compression surface 254 may change in cross-sectional shape along its width as well as along its height (i.e., hemispherical in shape, and the like).

The plunger 242 also defines a compression plane 266 extending substantially parallel to the overall shape of the compression surface 254 and fixed with respect thereto. During operation, rotational movement of the compression plane 266 about an axis of rotation 270 forms a compression angle 274 with the axis 218 of the compression chamber 96 (see FIG. 5A). In the illustrated implementation, the axis of rotation 270 of the plunger 242 is substantially aligned with the rotational axis of the output shaft 234.

Figure 5A:
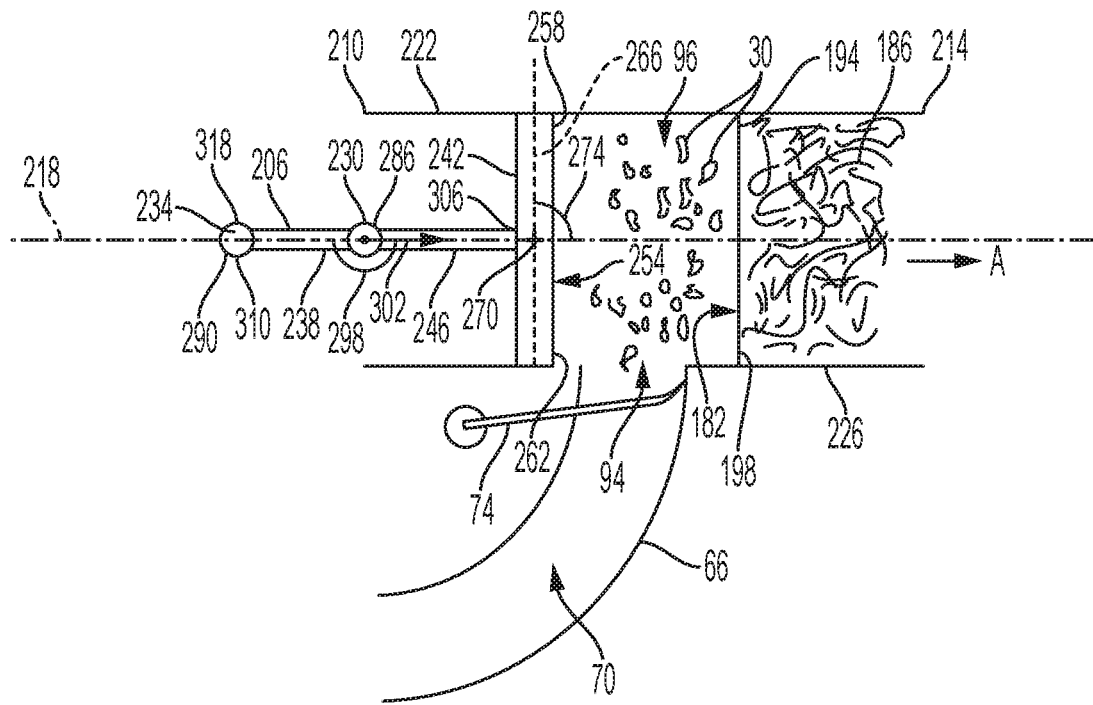
FIGS. 5A-5F are a schematic view of the baler of FIG. 1 showing the plunger assembly in various positions of operation.

Each crank arm 238 of the plunger assembly 206 is substantially elongated in shape and transfers torque between the output shaft 234 and the connecting frame 246. Referring to FIG. 5A, each crank arm 238 defines a first crank mounting point 286 and a second crank mounting point 290 spaced a distance from the first crank mounting point 286. When assembled, the first crank mounting point 286 is coupled to and rotates together with the output shaft 234 of the gearbox 230 while the second crank mounting point 290 is coupled to the connecting frame 246 and travels around the first crank mounting point 286 in a substantially circular path.

As shown in FIGS. 5A-5F, each crank arm 238 also produces a crank angle 298 defined as the angle extending between the crank arm 238 and a ray 302 originating at the rotational axis of the output shaft 234 and extending along the axis 218 toward the second end thereof 214. The crank angle 298 extends in a clockwise manner such that the crank arm 238 forms a 0 degree crank angle 298 when the crank arm 238 extends toward the second end 214 of the bale case 202 (see FIG. 5D); forms a 90 degree crank angle 298 when the crank arm 238 extends toward the bottom wall 226 (see FIG. 5F); forms a 180 degree crank angle 298 when the crank arm 238 extends toward the first end 210 of the bale case 202 (see FIG. 5A); and forms a 270 degree crank angle 298 when the crank arm 238 extends toward the top wall 222 (see FIG. 5B).

The connecting frame 246 of the plunger assembly 206 is substantially elongated in shape and includes a first end 306 fixedly coupled to the plunger 242, and a second end 310 spaced a distance from the first end 306 to define one or more third mounting points 318. When assembled, the third mounting points 318 of the connecting frame 246 are each coupled to a respective one of the second mounting points 290 of the crank arms 238 for movement together therewith. In the illustrated implementation, the connecting frame 246 is fixed relative to the plunger 242 such that the connecting frame 246 and the plunger 242 move together as a unit.

Together, the output shaft 234, the connecting frame 246, and the crank arm 238 move the plunger 242 translationally and rotationally within the compression chamber 96 during the baling process. More specifically, the plunger 242 moves both linearly along the axis 218 of the compression chamber 96 and angularly relative to the axis 218. Due to the fixed relationship between the connecting frame 246 and the plunger 242, the translational and rotational position of the plunger 242 is completely defined for every given crank angle 298.

Figure 5B:
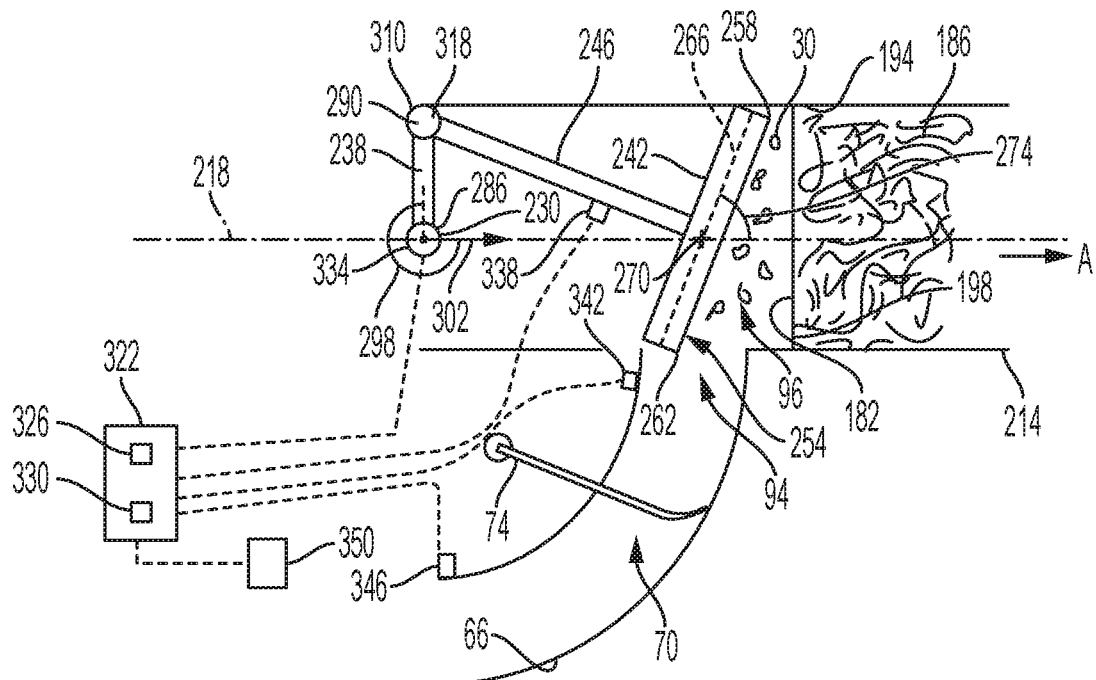

With regards to the linear motion of the plunger 242, the plunger 242 translates or moves linearly along the axis 218 of the compression chamber 96 between an extended position (see FIG. 5D), in which the plunger 242 is its furthest distance from the output shaft 234, and a retracted position (see FIG. 5A), in which the plunger 242 is at its closest distance from the output shaft 234. As shown in FIGS. 5A and 5D, the plunger 242 is in the extended position when the crank arm 238 has a crank angle of 0 degrees, and the plunger 242 is in the retracted position when the crank arm 238 has a crank angle of 180 degrees.

In addition to moving linearly along the axis 218 of the compression chamber 96, the plunger 242 also reciprocates angularly with respect to the axis 218 of the compression chamber 96 during the baling process. In the illustrated implementation, the plunger 242 rotates about the axis of rotation 270 between a maximum forward rotational position (see FIG. 5B), in which the compression plane 266 creates a first compression angle 274a, and a maximum retracted rotational position (see FIG. 5F), in which the compression plane 266 creates a second compression angle 274b that is larger than the first compression angle 274a. As shown in FIGS. 5B and 5F, the plunger 242 is in the maximum forward rotational position when the crank arm 238 has a crank angle of 270 degrees, and the plunger 242 is in the maximum retracted rotational position when the crank arm 238 has a crank angle of 90 degrees.

Illustrated in FIG. 5B, the baler 10 also includes a controller 322 to monitor and direct the baling process. The controller 322 includes a processor 326, a memory unit 330 in operable communication with the processor 326, one or more sensors 334, 338, 342, 346 sending and receiving signals with the processor 326, and a user input 350 in operable communication with the processor 326. The processor 326 is also in operable communication with various elements of the baler 10 including, but not limited to, the first set of actuators 146, the second set of actuators 162, the lifting fork 74, and the plunger assembly 206. During use, the processor 326 receives signals from the one or more sensors 334, 338, 342, inputs that information into one or more predetermined control algorithms, and outputs signals to the first and second sets of actuators 146, 162 to control the size and shape of the pre-compression chamber 70. The processor 326 also uses the data provided by the one or more sensors 334, 338, 342, to calculate the real-time vertical profile 354 of the forming bale 186. For the purposes of this application, the real-time vertical profile 354 of the forming bale 186 is generally defined as a map of two or more real-time data readings, and their corresponding locations, within the forming bale 186. More specifically, the vertical profile 354 of the illustrated implementation includes two or more real-time density readings, and their corresponding vertical locations (e.g., heights), within the forming bale 186.

In particular, the baler 10 includes a crank arm position sensor 334, a bale compression sensor 338, an inlet sensor 342, and an outlet sensor 346. The sensors 334, 338, 342, 346 may be present individually, in plurality, or in combination. Although not illustrated, the controller 322 may also include additional sensors such as, but not limited to, a plunger position sensor, a pre-compression chamber fill sensor, and a forming bale density sensor. While the sensors of the illustrated implementation are electronic in nature, it is to be understood that in alternative implementations the controller 322 and sensors may be mechanical in nature or be virtually modeled based at least in part on other sensor readings.

The crank arm position sensor 334 includes a sensor mounted to the crank arm 238 and configured to measure the relative position of the crank arm 238 with respect to the frame 14 of the baler 10 (e.g., the crank angle 298). The crank arm position sensor 334 may include a sensor mounted directly to the crank arm 238, a sensor mounted on the first output shaft 234, and the like. Such sensors may include Hall Effect sensors, variable resistance sensors, optical sensors, and the like. In the present implementation, the fully defined nature of the plunger assembly 206 permits the processor 326 to determine the translational and rotational orientation of the plunger 242 within the compression chamber 96 based at least in part on the crank arm position reading provided by the crank arm position sensor 334.

The bale compression sensor 338 includes a sensor configured to detect the compressive force exerted by the plunger 242 against the deposit surface 182 of the forming bale 186. In the illustrated implementation, the bale compression sensor 338 is mounted to the connecting frame 246 and is configured to detect the level of compressive force exerted thereon; however, in alternative implementations the bale compression sensors 338 may be mounted to the compressive surface 254 of the plunger 242, may record the torque exerted against the output shaft 234, and the like. Such sensors may include Hall Effect sensors, variable resistance sensors, load sensors, optical sensors, and the like.

The inlet sensor 342 includes a sensor configured to detect or calculate the inlet area 122 of the inlet 90. In the illustrated implementation, the inlet sensor 342 is configured to detect the inlet height 130 by tracking the relative location of the first edge 110 of the second wall 82 relative to the first edge 98 of the first wall 78; however, in alternative implementations, different types and styles of sensors may be used.

The outlet sensor 346 includes a sensor configured to detect or calculate the outlet area 134 of the outlet 94. In the illustrated implementation, the outlet sensor 346 is configured to detect the outlet height 142 by tracking the relative location of the second edge 114 of the second wall 82 relative to the second edge 102 of the first wall 78; however, in alternative implementations, different types and styles of sensors may be used.

As shown in FIGS. 5A-5F, the plunger 242 begins each baling stroke from the retracted position (see FIG. 5A) with the compression plane 266 substantially normal to the axis 218 of the compression chamber 96 (i.e., producing a 90 degree compression angle 274) and the crank arm 238 producing a 180 degree crank angle 298. Furthermore, the pre-compression chamber 70 begins having a pre-determined size and shape as instructed by the controller 322.

During the baling process, the crank arm 238 rotates in a substantially clockwise direction. As the crank arm 238 rotates from the 180 degree crank angle 298 toward the 270 degree crank angle 298, the movement of the crank arm 238 causes the plunger 242 to move along the axis 218 toward the extended position (e.g., in direction A) while simultaneously rotating about the rotation axis 270 in a clockwise direction causing the compression angle 274 to decrease (compare FIG. 5A to FIG. 5B).

After the crank arm 238 passes through the 270 degree crank angle 298 (see FIG. 5B), the plunger 242 continues to move toward the extended position in direction A but reverses rotational direction and begins to rotate counter-clockwise. This causes the compression angle 274 to begin to increase (compare FIG. 5B with FIG. 5C).

During the above described movement, the lifting fork 74 of the feed system 22 cycles through a "feed stroke" to inject crop material 30 into the compression chamber 96. More specifically, the lifting fork 74 travels through the pre-compression chamber 70 engaging the crop material 30 positioned therein and directs the crop material 30 through the outlet 94 and into the compression chamber 96 between the plunger 242 and the deposit surface 182 of the forming bale 186. As indicated above, the size and shape of the pre-compression chamber 70 at least partially determines the resulting deposit distribution 190.

Figure 5C:
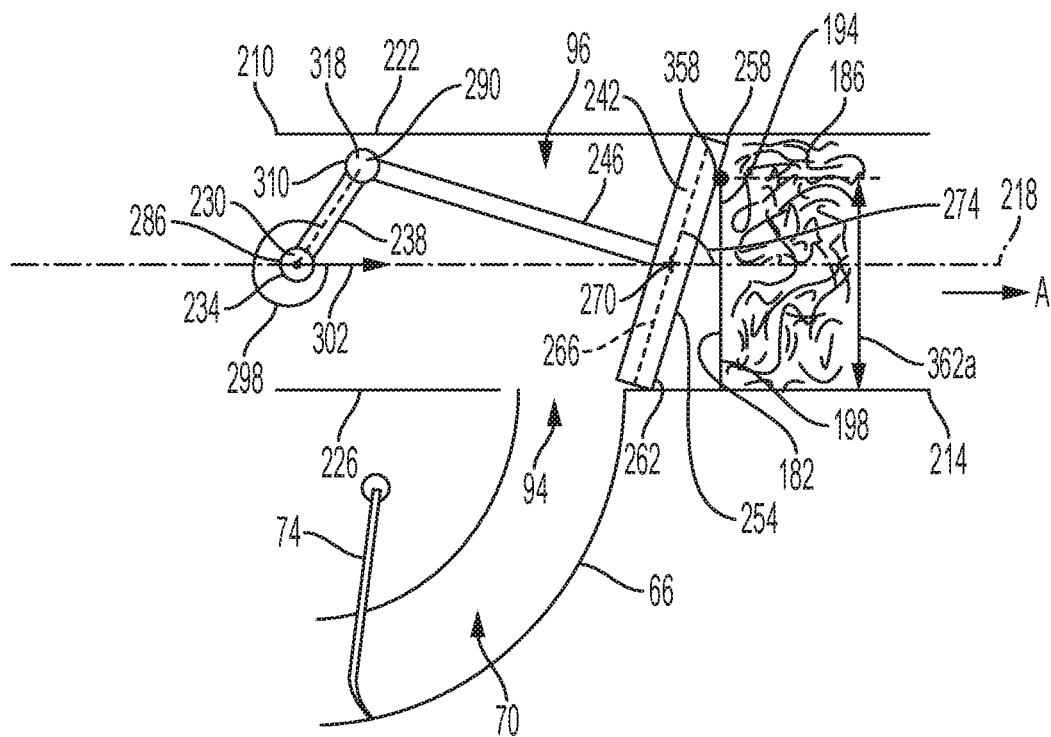
Figure 5D:
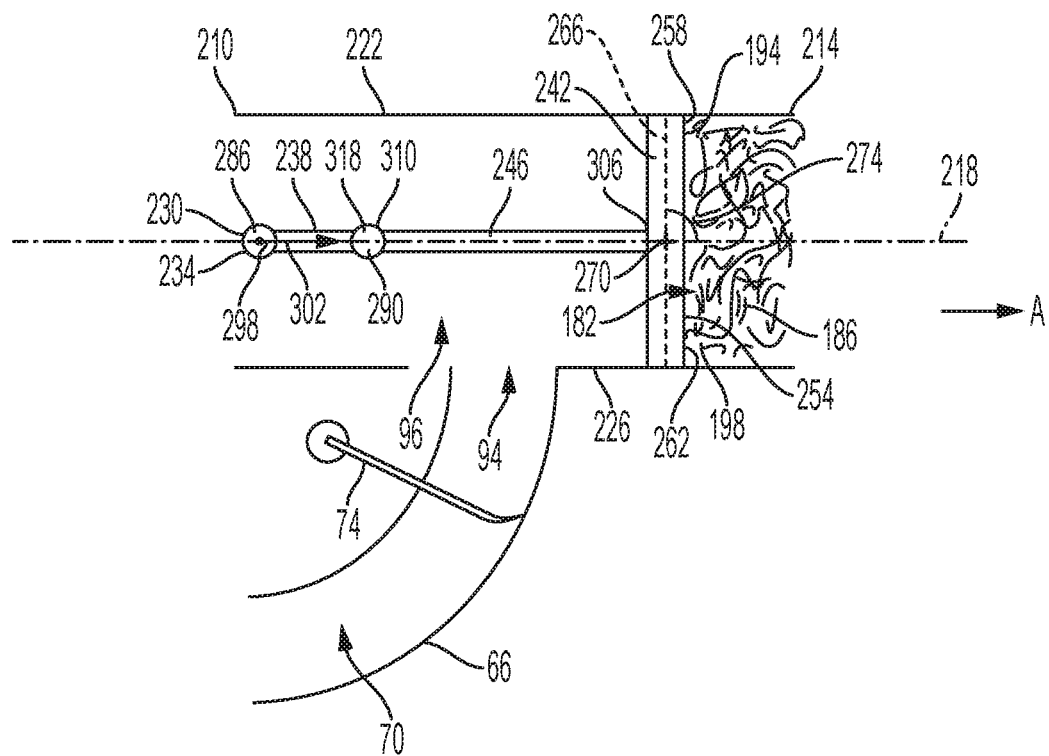
Figure 5E:
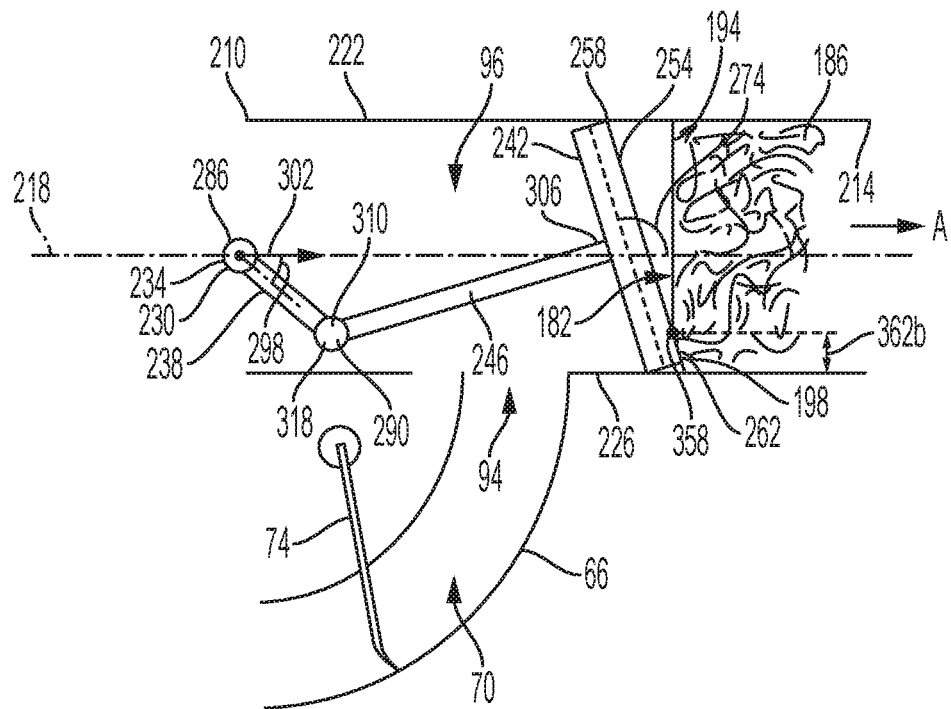
Figure 5F:
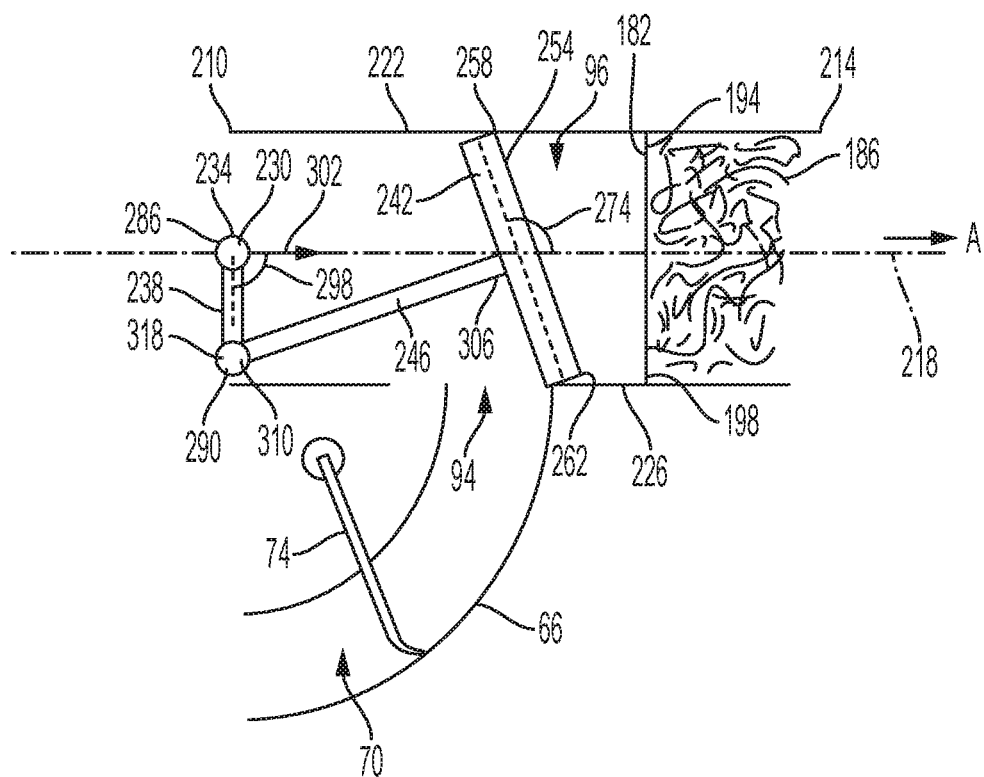
Figure 6A:
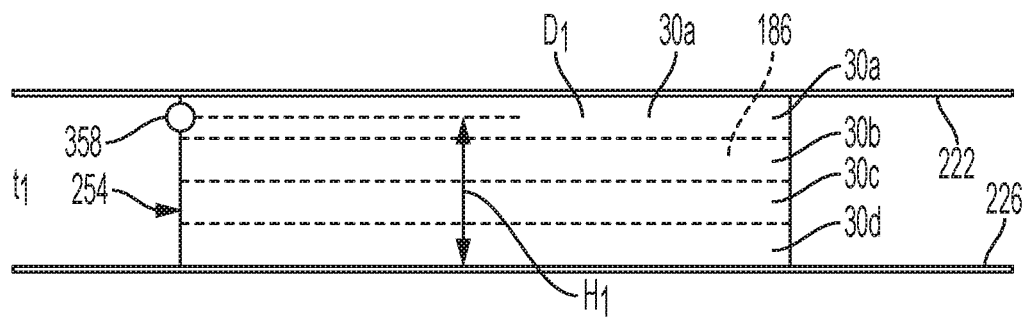
FIGS. 6A-6D illustrate the baler configurations for multiple density data points.
Figure 6B:
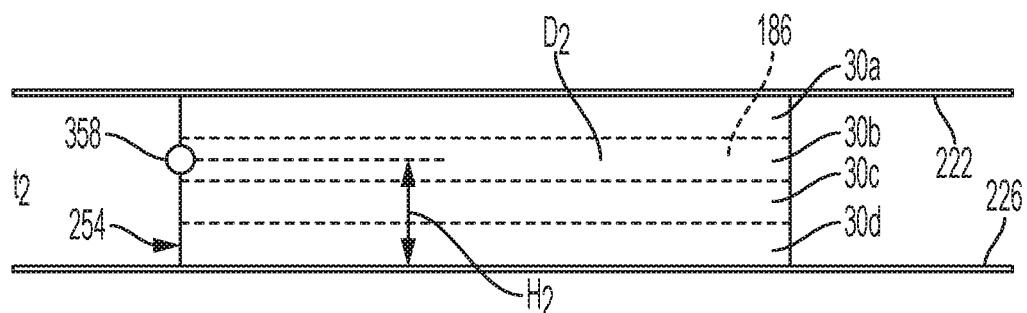
Figure 6C:
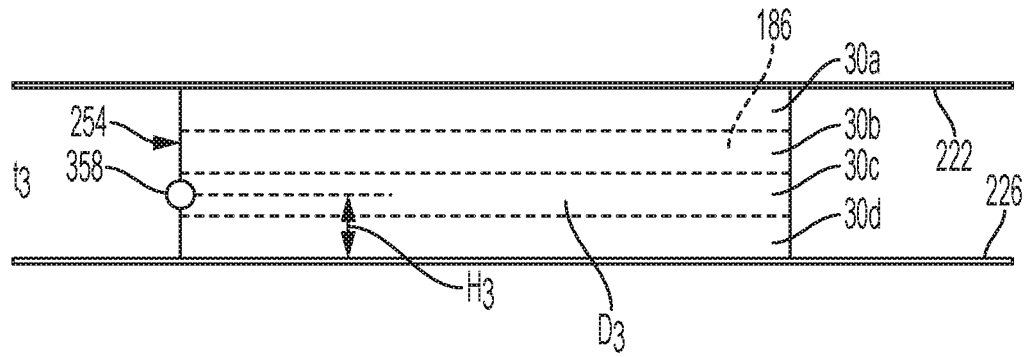
Figure 6D:
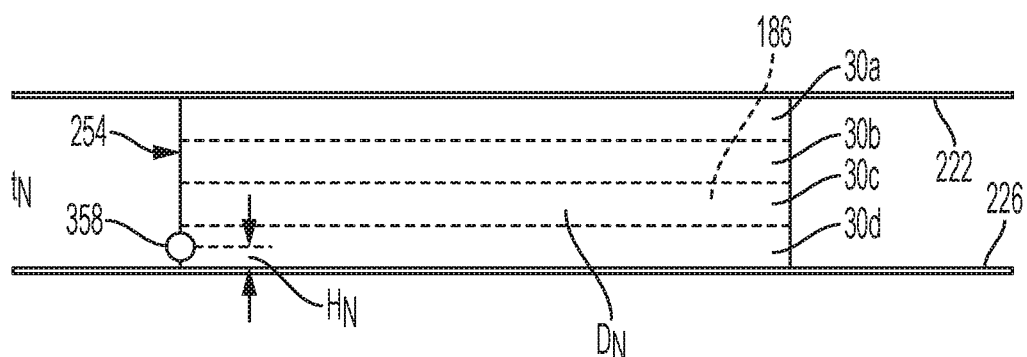

Once the crop material 30 is injected into the compression chamber 96, the advancing motion of the plunger 242 captures the newly introduced crop material 30 between itself and the forming bale 186 (see FIG. 5C). While doing so, the rotational orientation of the plunger 242 within the compression chamber 96 creates a "primary contact point 358" on the compression surface 254. For the purposes of this application, the primary contact point 358 is the area or region of the compression surface 254 where the maximum level of compressive force is being applied to the forming bale 186 at a given moment in the baling process. In the present implementation, the primary contact point 358 includes a narrow band extending across the width of the compression surface 254. As shown in FIGS. 5C and 5E, the primary contact point 358 defines a contact height 362, which is generally defined as the distance between the bottom wall 226 and the primary contact point 358 (e.g., the height at which the contact point 358 is positioned within the compression chamber 96).

While the plunger 242 is engaged with the forming bale 186, the rotation of the crank arm 238 causes the plunger 242 (and compression plane 266) to rotate about the axis of rotation 270 in a counter-clockwise direction increasing the compression angle 274 (compare FIG. 5C to FIG. 5E). This rotation causes the primary contact point 358 to move relative to the compression surface 254 from a first position, in which the primary contact point 358 is positioned proximate the top edge 194 and defines a first contact height 362a (see FIG. 5C), to a second position, in which the primary contact point 358 is position proximate the bottom edge 198 and defines a second contact height 362b that is less than the first contact height 362a (see FIG. 5E). As such, the compression surface 254 of the plunger 242 progressively compresses the captured crop material 30 from the top edge 194 to the bottom edge 198 over the entire width of the deposit surface 182. By doing so, the compressive forces of the plunger 242 are primarily focused on the crop material 30 located in direct contact with and immediately adjacent to the primary contact point 358 at any one point in time.

Once the compression segment of the baling process is complete, the plunger 242 disengages from the forming bale 186 and returns back to the retracted position to begin the cycle anew (see FIGS. 5F and 5A). As the plunger 242 returns to its initial retracted position, the controller 322 is able to actively adjust the size and shape of the pre-compression chamber 70, as described above, to modify the deposit distribution 190 on the subsequent baling stroke.

In some implementations, the processor 326 of the controller 322 is configured to calculate the real-time density of the crop material 30 within the forming bale 186 at two or more locations and produce a real-time vertical profile 354 therefrom. To do so, the processor 326 receives a stream of data from the crank position sensor 334 and the bale compression sensor 338 indicating the real-time compressive force being applied by the plunger 242 against the forming bale 186 and the real-time crank angle 298, respectively. For each refresh cycle of controller 322 (e.g., t1, t2, t3, . . . tn), the controller 322 receives a corresponding compression reading C1, C2, C3, . . . Cn and crank angle reading A1, A2, A3, . . . An.

Using a combination of system models, control algorithms, and geometry, the controller 322 is then able to use the compression and crank angle readings to calculate the density D1, D2, D3, . . . Dn of the crop material 30 at or near the primary contact point 358 and the corresponding height H1, H2, H3, . . . Hn within the forming bale 186 for which that density reading applies (see FIGS. 6A-6D). To do so, the controller 322 generally relies on the orientation of the plunger 242 with respect to the compression chamber 96 and the compressive force applied by the plunger 242 against the forming bale 186.

More specifically, for each reading (t1, t2, t3, . . . 5n), the controller 322 uses the fully defined layout of the plunger assembly 206 and the real-time crank angle A1, A2, A3, . . . An to calculate the real-time contact height H1, H2, H3, . . . Hn of the primary contact point 358 (e.g., the location where the most compressive forces are primarily being applied). Furthermore, the controller 322 uses the defined layout of the plunger assembly 206, the crank angle A1, A2, A3, . . . An, and the compressive reading C1, C2, C3, . . . Cn to calculate the density of the crop material 30a, 30b, 30c, . . . 30n generally in contact and vertically aligned with the primary contact point 358 (see FIGS. 6A-6D). With this information, the controller 322 is able to produce a series of density data points, each representing the density of the crop material 30 at a particular location within the forming bale 186.

The processor 326 then compiles the data points to form a real-time vertical profile 366 (see FIGS. 7A and 7B), generally representing the overall density layout of the forming bale 186. However, in alternative implementations, the processor 326 may also enter the individual data points into one or more algorithms or computer models to calculate a complete and continuous model of the density of the forming bale 186. In still other implementations, the vertical profile 366 may include other data sets, such as but not limited to, the compressive force C1, C2, C3, . . . Cn applied by the plunger 242 at each corresponding height H1, H2, H3 . . . Hn, the pressure applied by the plunger 242 at different heights H1, H2, H3 . . . Hn, and the like.

In the illustrated implementation, the processor 326 may constantly "refresh" the vertical profile 366 in real time. However, in alternative implementations the processor 326 may refresh the vertical profile 366 after each completed plunger stroke. In still other implementations, the processor 326 may refresh the vertical profile 366 after a pre-determined range of motion or after the crank arm 328 rotates past a pre-determined crank angle 298. In still other implementations, the processor 326 may wait to begin collecting data on the real-time vertical profile 366 until after the lower edge 262 of the plunger 242 passes beyond the stationary shear knife 374 of the outlet 94 of the pre-compression chamber 70 (see FIG. 5C). By doing so, the processor 326 can assure that any residual crop material 30 hanging below the plunger 242 was removed by the shear knife 374 which allows for more accurate readings.

While the illustrated processor 326 is shown operating in conjunction with a plunger assembly 206 where the rotational and translational position of the compression surface 254 is fully defined based at least in part on the crank angle 298, it is to be understood that the processor 326 may also be used together with alternative styles of plunger assemblies (not shown). For example, in some implementations the processor 236 may be used together with an actively adjustable plunger whose translational and rotational position may be adjusted independent of the rotation of the crank arm (not shown). In such implementations, the processor 326 may include additional sensors (not shown) to determine the orientation of the compression surface 254 within the compression chamber 96 in place of or in addition to the crank arm position sensor 334.

Figure 9:
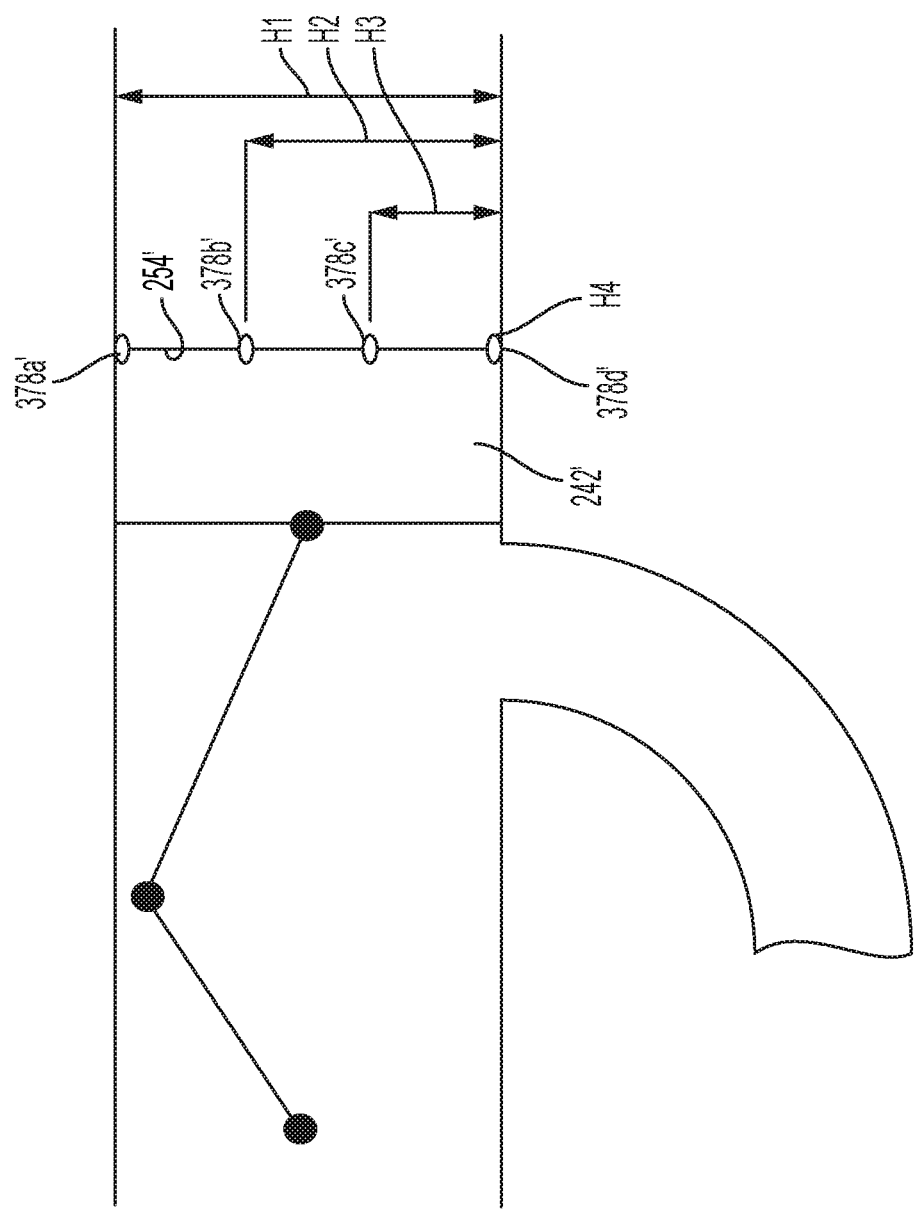
FIG. 9 illustrates another implementation of the baler.

In still other implementations, the processor 326 may be used together with a purely translational plunger 242' (see FIG. 9). In such implementations, the compression surface 254' of the purely translational plunger 242' may include a plurality of force or pressure sensors 378a, 378b, 378c, 378d, each spaced vertically along the height of the compression surface 254'. During use, the processor 326 is pre-programmed with the corresponding height H1', H2', H3', H3' of each sensor 378a, 378b, 378c, 378d allowing the processor 326' to determine the compressive force C1, C2, C3, C4 applied to the forming bale at each of the corresponding heights H1', H2', H3', H4' and produce a real-time vertical profile 366 of the forming bale 186 as described above.

In still other implementations, the processor 326 of the controller 322 is configured to adjust the size and shape of the pre-compression chamber 70 based at least in part on a detected "bale attribute" of the forming bale 186. More specifically, the processor 326 is configured to receive a continuous stream of information from the sensors 334, 338, 342, 346 regarding one or more bale attributes of the forming bale 186, receive one or more user inputs via the user interface 350, enter and compare both the sensor information and user inputs using one or more control algorithms, and output signals to the first and second sets of actuators 146, 162 to adjust the size and shape of the pre-compression chamber 70.

In the present implementation, the detected "bale attribute" may include, but is not limited to, the real-time vertical profile 366, the density reading at a particular location within the forming bale 186, the moisture content of the crop material 30, the flake shape of the crop material 30, the dimensions of the forming bale 186, and the like. Similarly, the user inputs may include, but are not limited to, a vertical density profile, a desired density reading at a particular location within the forming bale 186, the anticipated moisture content of the crop material 30, the anticipated flake shape of the crop material 30, the crop type to be baled, the desired dimensions of the forming bale 186, and the like.

In other implementations, the user may input a desired vertical profile into the user interface 350 and the processor 326 may adjust the size and shape of the pre-compression chamber 70 to produce the desired vertical profile. In such implementations, the processor 326 is configured to calculate the real-time vertical profile 366 (described above), compare the desired vertical profile to the real-time vertical profile 366, and adjust the size and shape of the pre-compression chamber 70 to re-direct the distribution of crop material 30 onto the deposit surface 182 (e.g., the deposit distribution 190) and produce the desired vertical profile. For example, if the real-time vertical profile 366 indicates that the bale density is low proximate the top edge 194 of the deposit surface 182 (see FIG. 7B), the processor 326 will output signals to the second set of actuators 162 signaling an increase in the outlet area 134 to increase the relative volume of crop material 30 distributed proximate the top edge 194 of the deposit surface 182 (see FIG. 4A; described above). In contrast, if the real-time vertical profile 366 indicates that the bale density is low proximate the bottom edge 198 of the deposit surface 182 (see FIG. 7A), the processor 326 will output signals to the second set of actuators 162 signaling a decrease in the outlet area 134 to increase the relative volume of crop material 30 distributed proximate the bottom edge 198 of the deposit surface 182 (see FIG. 4B; described above).

In still other implementations, the processor 326 may be configured to adjust the size and shape of the pre-compression chamber 70 based at least in part on the volume of crop material 30 positioned therein. For example, the processor 326 may send signals to the first and second sets of actuators 146, 162 instructing them to increase the overall volume of the pre-compression chamber 70 to accommodate additional crop material 30 as the pre-compression chamber 70 fills over time. In such implementations, the processor 326 may be configured to monitor the volume of crop material 30 positioned within the pre-compression chamber 70, and when the volume exceeds a pre-determined minimum increase one of the inlet area 122 or the outlet area 134 to avoid any type of jamming when the lifting fork 74 undergoes a feed stroke (described above). More specifically, the processor 326 is configured to enlarge the outlet area 134 to provide additional cross-sectional area within the pre-compression chamber 70 to avoid jamming as the crop material 30 is ejected therefrom.

In still other implementations, the processor 326 may be configured to adjust the size and shape of the pre-compression chamber 70 based at least in part on the attributes of the crop material 30 being harvested by the baler 10. More specifically, the processor 326 may adjust the pre-compression chamber 70 based at least in part on the density of the crop material 30, the moisture content of the crop material 30, the type of crop being harvested, and the like.

While the illustrated processor 326 actively adjusts the size and shape of the pre-compression chamber 70 in response to the inputs described above, in alternative implementations the processor 326 may be configured to provide output signals to the user via the user interface 350 providing instructions on how the user can adjust the operating parameters of the baler 10 to produce the desired bale attributes (as described above). Such outputs may include, but are not limited to, instructing the user to adjust the inlet area 122, instructing the user to adjust the outlet area 134, instructing the user to adjust the speed of the baler 10 relative to the support surface 42, instructing the user to adjust the plunger assembly 206, instructing the user to adjust the feed system 22, and the like. In still other implementations, the processor 326 may also include a hybrid system where some elements are adjusted automatically and others are adjusted manually by the user.

Figure 8A:
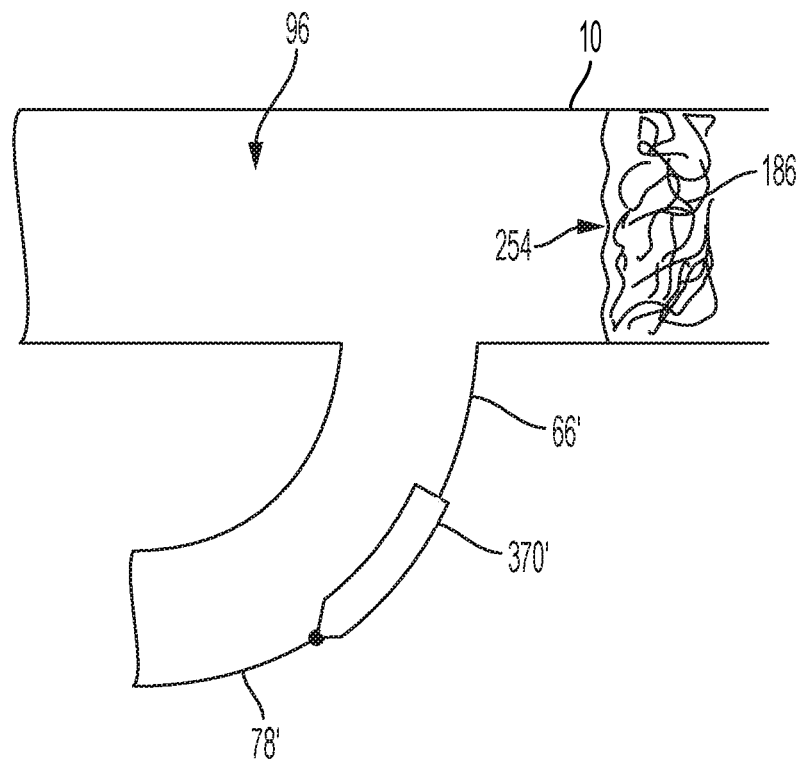
FIGS. 8A-8B illustrate another implementation of a feed pan.
Figure 8B:
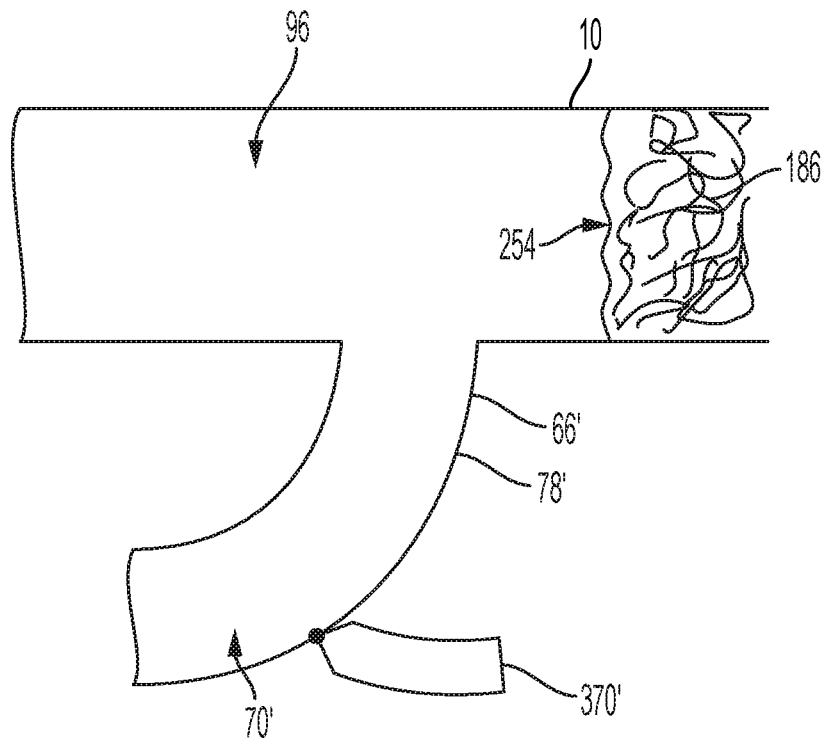

FIG. 8 illustrates an alternative implementation of the feed pan 66'. The feed pan 66' is substantially similar to and operates in a similar fashion to the feed pan 66 described above. As such, only the differences will be described herein. As shown in FIG. 8, the feed pan 66' includes a series of vanes 370' positioned proximate the first wall 78' and configured to be continuously adjustable with respect thereto between a retracted position (see FIG. 8A), in which the vanes 370' are positioned outside the pre-compression chamber 70', and a deployed position (see FIG. 8B), in which the vanes 370' are at least partially positioned within the pre-compression chamber 70'. During use, moving the vanes 370' between deployed and retracted positions influences the manner in which the crop material 30 travels through the pre-compression chamber 70', is ejected into the compression chamber 96, and is deposited onto the deposit surface 182 of the forming bale 186. Generally speaking, the vanes 370' may be used is lieu of or together with the other features of the feed pan 66' (e.g., the first set of actuators 146' or the second set of actuators 162') to influence the movement of crop material 30 through the baler 10.

The invention claimed is:

1. A baler for use with a forming bale having a first bale attribute, the baler comprising:
a frame;
a compression system coupled to the frame, the compression system at least partially defining a compression chamber sized to receive at least a portion of the forming bale therein;
a plunger positioned within and movable with respect to the compression chamber;
a feed pan at least partially defining a pre-compression chamber, wherein the shape of the pre-compression chamber is adjustable, and wherein the pre-compression chamber is open to the compression chamber;
a first sensor in operable communication with the plunger and configured to output signals representing an orientation of the plunger with respect to the compression chamber;
a second sensor in operable communication with the plunger and configured to output signals representing a compressive force applied by the plunger; and
a controller in operable communication with the feed pan, the first sensor, and the second sensor, and wherein the controller is configured to actively adjust the shape of the pre-compression chamber based at least in part upon signals received from the first sensor and the second sensor.

2. The baler of claim 1, wherein the feed pan defines an inlet having an inlet area and an outlet having an outlet area, and wherein adjusting the size of the pre-compression chamber includes adjusting at least one of the outlet area and the inlet area.

3. The baler of claim 1, wherein the compression system includes a crank arm, and a connecting frame extending between and coupled to both the crank arm and the plunger, and wherein the first sensor is configured to output signals representing a crank angle.

4. The baler of claim 3, wherein the second sensor is in operative communication with the connecting frame and configured to output signals representing the force transmitted between the crank arm and the plunger.

5. The bale of claim 1, wherein the controller is configured to calculate the density of the forming bale based at least in part on the signals output by the first sensor and the second sensor.

6. The baler of claim 1, wherein the pre-compression chamber extends between an inlet and an outlet, wherein the inlet defines an inlet area and the outlet defines an outlet area, the baler further comprising a third sensor in operable communication with the feed pan and configured to output signals representative of at least one of 1) the inlet area and 2) the outlet area of the pre-compression chamber, the controller further in operable communication with the third sensor, wherein the controller is configured to use the output signals provided by one or more of the first sensor, the second sensor, and the third sensor to determine a real-time vertical profile of the forming bale.

* * * * *